United States Patent [19]
Chu

[11] Patent Number: 5,956,707
[45] Date of Patent: Sep. 21, 1999

[54] DATABASE SYSTEM WITH QUERY RELAXATION USING TYPE ABSTRACTION HIERARCHY (TAH) AS QUERY CONDITION RELAXATION STRUCTURE

[76] Inventor: Wesley W. Chu, 16794 Charmel La., Pacific Palisades, Calif. 90272

[21] Appl. No.: 08/800,035

[22] Filed: Feb. 13, 1997

[51] Int. Cl.$^6$ .................................................. G06F 17/30
[52] U.S. Cl. ...................... 707/3; 707/1; 395/1; 395/10; 395/12
[58] Field of Search ............................... 364/283.15, 974, 364/274.14; 395/603, 12, 10, 1; 707/1, 3

[56] References Cited

U.S. PATENT DOCUMENTS

| | | | |
|---|---|---|---|
| 3,987,281 | 10/1976 | Hodes . | |
| 5,136,538 | 8/1992 | Karmarker et al. | 364/402 |
| 5,212,791 | 5/1993 | Damian et al. | 364/468 |
| 5,216,593 | 6/1993 | Dietrich et al. | 364/402 |
| 5,353,229 | 10/1994 | Tanaka | 364/468 |
| 5,671,404 | 9/1997 | Lizee et al. | 707/5 |
| 5,758,332 | 5/1998 | Hirotani | 707/1 |

*Primary Examiner*—Paul V. Kulik
*Assistant Examiner*—Jean M. Corrielus
*Attorney, Agent, or Firm*—David G. Alexander

[57] ABSTRACT

A system for obtaining target data from a conventional computer database in response to an input query which has at least one attribute includes a Type Abstraction Hierarchy (TAH) manager for providing a TAH structure including relaxation conditions for said at least one attribute. A control unit successively applies a database query which corresponds to the input query to and receives data from the database, with progressively relaxed conditions of the attribute(s) being provided by the TAH manager, until the target data in the form of a specified number of ranked answers which satisfy the attribute conditions is obtained. The attribute relaxation process can be controlled such as relaxation order, preference list, reject, etc. to obtain user and context specific answers. The system can produce approximate answers or answers to query with conceptual terms. The input query can including cooperative operators such as "APPROXIMATELY", "NEAR TO" or "SIMILAR TO" or conceptual terms (e.g. "long"), which the conventional database is not capable of directly processing. The control unit converts the cooperative operators and conceptual terms into database operator which the database is capable of processing. The TAH structure includes TAHs having leaves corresponding to instances of the attributes respectively, and a hierarchical arrangement of nodes that specify ranges which include at least one of the instances respectively. The instances can be numerical and/or non-numerical. The nodes can be defined by conceptual names (terms) that describe the instances under that node (e.g. dark color, long runway).

75 Claims, 12 Drawing Sheets

| AIRLINE | ARR. APORT | ARR. CITY | ARR. TIME | COST | DEPART. APORT | DEPART. CITY | DEPART. TIME | FLIGHT NO. | FLIGHT STOP OVER | STOP APORT | STOP CITY |
|---|---|---|---|---|---|---|---|---|---|---|---|
| American | LAX | Los Angeles | 11 | 99 | SFO | San Francisco | 10 | AA 1873 | NS | | |
| American | JFK | New York | 16 | 725 | LAX | Los Angeles | 9 | AA 110 | NS | | |
| American | NWK | Newark | 18 | 695 | LAX | Los Angeles | 11 | AA 120 | NS | | |
| American | JFK | New York | 20 | 550 | LAX | Los Angeles | 10 | AA 140 | S | SFO | San Francisco |
| United | JFK | New York | 16 | 700 | LAX | Los Angeles | 9 | UA 010 | NS | | |
| United | NWK | Newark | 17 | 700 | LAX | Los Angeles | 10 | UA 011 | NS | | |
| United | NWK | Newark | 19 | 500 | LAX | Los Angeles | 10 | UA 015 | S | CGO | Chicago |
| Delta | NWK | Newark | 16 | 725 | LAX | Los Angeles | 9 | DL 1104 | NS | | |
| Delta | JFK | New York | 19 | 500 | LAX | Los Angeles | 10 | DL 1105 | S | ALT | Atlanta |

FIGURE 4 depart

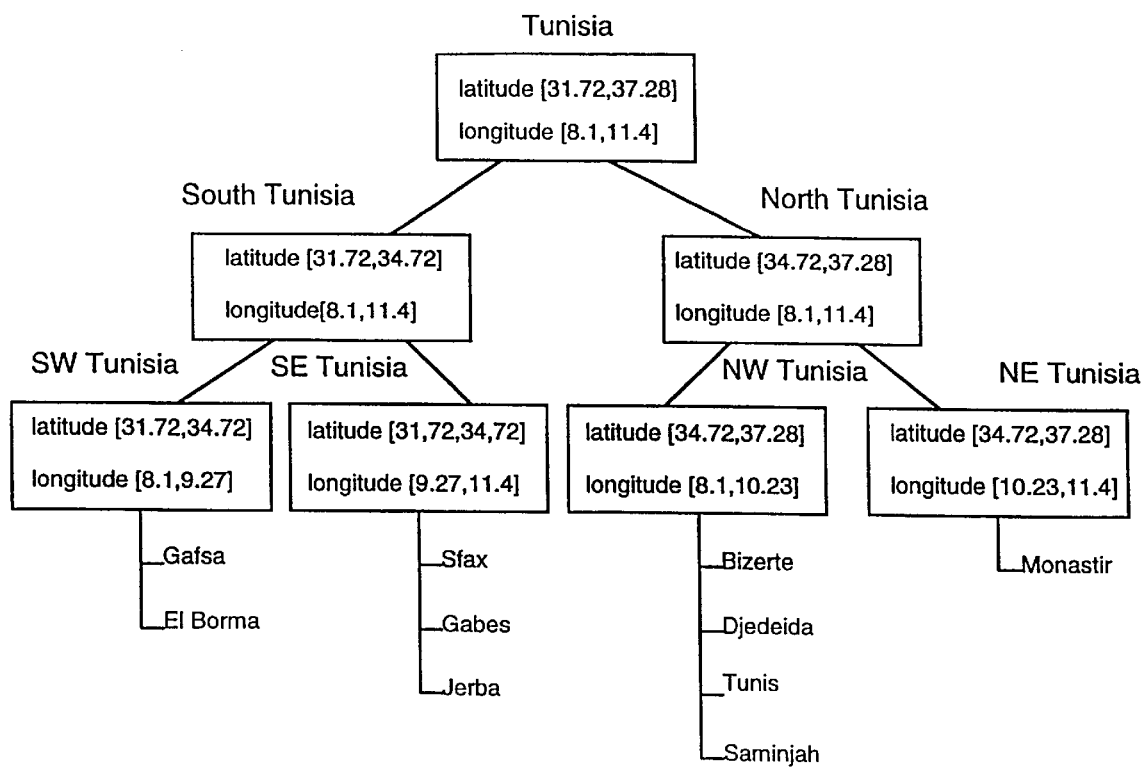
FIGURE 12. An MTAH for the airports in Tunisia and its location

DATABASE SYSTEM WITH QUERY RELAXATION USING TYPE ABSTRACTION HIERARCHY (TAH) AS QUERY CONDITION RELAXATION STRUCTURE

BACKGROUND OF THE INVENTION

1. Field of the Invention

The present invention generally relates to the art of computer database systems, and more specifically to a database system with query relaxation using a Type Abstraction Hierarchy (TAH) as a query condition relaxation structure.

2. Description of the Related Art

Conventional computer databases such as Sybase, Oracle, etc., require a user to have detailed information regarding the data stored in a particular database file. For example, a file or schema for an airline reservation system may include variables or attributes including cost, flight number, departure airport, arrival airport, departure and arrival times, etc.

The attributes for a desired flight are entered into the database as a query, and the database returns an answer in the form of the data for a flight which satisfies the attribute conditions if one exists. If none exist, the database returns a message such as "match not found".

If no exact match is found, the user can relax various attributes based on his or her knowledge of the database until an answer which satisfies sufficiently relaxed conditions is found. For example, if a flight leaving at 10:00 is desired, and none is in the database, a relaxed departure time range of, for example, 9:30 to 10:30 can be manually entered into the query. The database will then return answers corresponding to flights having departure times within the specified range.

The file for the exemplary airline reservation system has a number of attributes (e.g. departure time, arrival time) which can be independently relaxed. The user must decide which attributes are more important than others, and within which ranges, in order to query the database to obtain an answer which is most desirable in view of the individual considerations. This requires knowledge and skill which must be obtained through considerable experience. Even with such knowledge and skill, manual manipulation of the database conditions is a time consuming and inherently "hit or miss" operation.

Conventional databases return only exact values or instances. They are not capable of returning approximate answers or processing conceptual queries. An example of the latter would be to locate a flight which arrives at a city "NEAR" New York at "APPROXIMATELY" 9:00.

In view of the above, a need exists in the art for a system for managing a conventional database which automates the process of progressively relaxing attributes until an acceptable answer is obtained. A further need exists for a system which is able to obtain approximate answers from a database, and to process conceptual queries.

SUMMARY OF THE INVENTION

The present invention overcomes the drawbacks of the prior art, and fulfills the needs described above, by providing a system and method for querying a conventional database which automates relaxation of attributes, produces approximate answers, and is capable of processing conceptual queries.

More specifically, a system according to the present invention for obtaining target data from a conventional computer database in response to an input query which has at least one attribute includes a Type Abstraction Hierarchy (TAH) manager for providing a TAH structure including relaxation conditions for the at least one attribute.

A control unit successively applies a database query which corresponds to the input query to and receives data from the database, with progressively relaxed conditions of the attribute(s) being provided by the TAH manager, until the target data in the form of a specified number of ranked answers which satisfy the attribute conditions is obtained. The attributes are relaxed in a specified order.

The system can produce approximate answers to specific queries or answers to conceptual queries (queries with conceptual terms, e.g. long). The input query can include a cooperative operator such as "APPROXIMATELY", or "SIMILAR TO", which the database is not capable of directly processing. The control unit converts the cooperative operator into a database operator which the database is capable of processing.

The TAH structure includes TAHs having leaves corresponding to instances of the attributes respectively, and a hierarchical arrangement of nodes that specify ranges which include at least one of the instances respectively. The instances can be numerical (e.g. runway length) and/or non-numerical (e.g. ship name, color). The nodes can have conceptual names, thus enabling the system to process queries with conceptual terms (e.g. long runway, light color).

These and other features and advantages of the present invention will be apparent to those skilled in the art from the following detailed description, taken together with the accompanying drawings, in which like reference numerals refer to like parts.

DESCRIPTION OF THE DRAWINGS

FIG. 4 is a table illustrating exemplary data in the form of airline flight information which is stored in a database that is managed by the present system;

FIG. 12 is a diagram illustrating the relationship between nodes and leaves in an exemplary conceptual multiple TAH (MTAH).

DETAILED DESCRIPTION OF THE INVENTION

Figure 1:
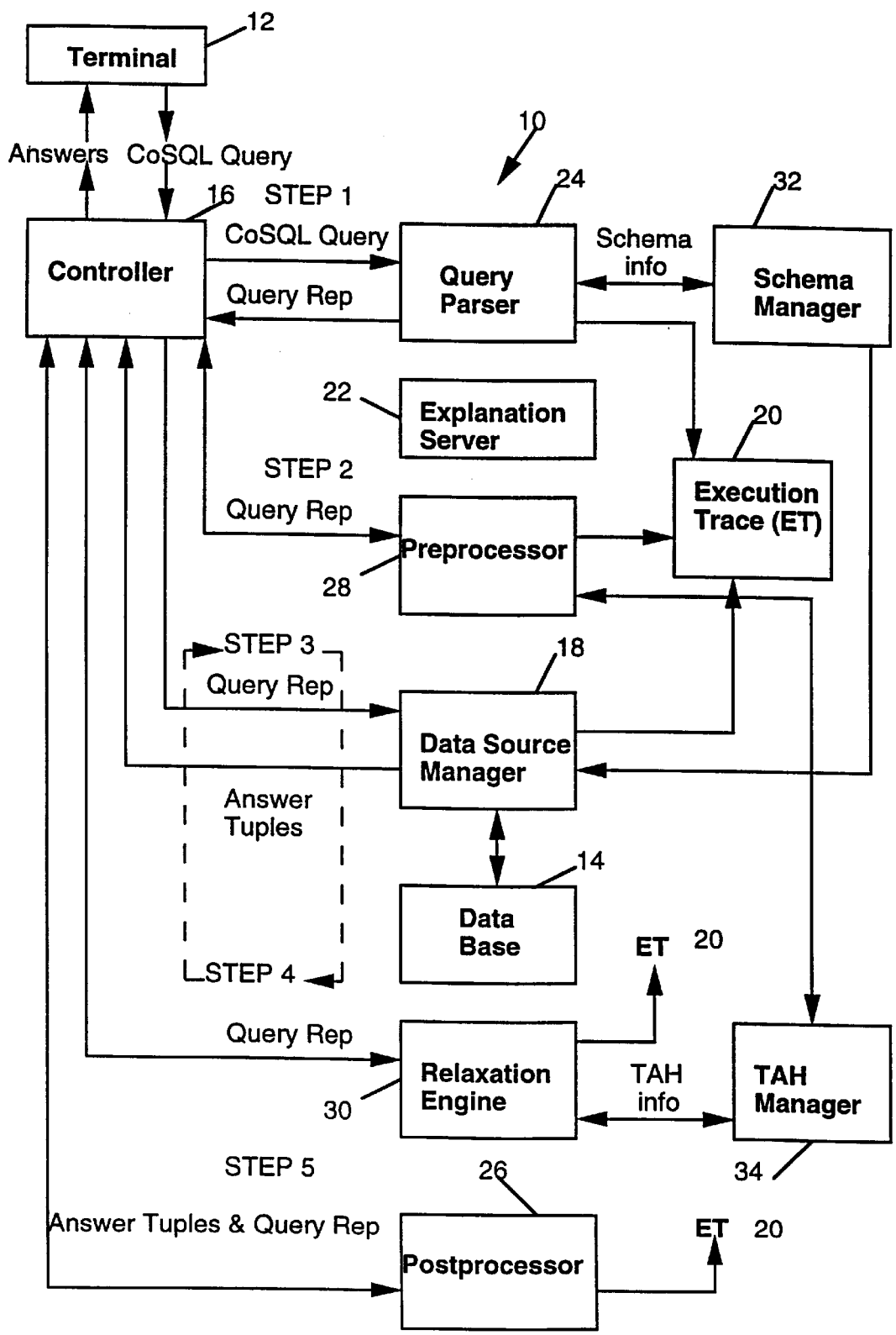
FIG. 1 is a block diagram of a database query system including a Type Abstraction Hierarchy (TAH) attribute condition relaxation structure according to the present invention.

A system 10 according to the present invention is connected to receive an input database query from a user via a conventional input terminal 12 which has a visual display and one or more input devices such as a keyboard and a mouse (not shown). The system 10 further comprises a database 14 such as Oracle, Sybase, etc. which is provided in a mass storage device such as a hard drive (not shown).

The database 14 includes an executable program and at least one file or schema which contains data for a particular application. For example, database 14 may store files for an airline reservation system, a medical imaging system, a character recognition system, etc.

The system 10 is preferably provided to end users as a program and associated files which are stored on a digital storage medium. The medium can be one or more magnetic disks (floppy disk), one or more optical disks (CD-ROM), etc. The medium can also be a volatile (RAM) or non-volatile (ROM) computer memory. The system 10 can be provided to users without the database 14, or as a bundled software package which includes the database 14.

The system 10 further comprises a controller 16 which receives input queries from the terminal 12, and returns target data or answers to the queries to the terminal 12. The controller 16 also controls and coordinates the other units of the system 10. It will be noted that the terminal 12 can be replaced by any other device, program or process which communicates with the controller 16 within the scope of the invention.

The database 14 receives queries and produces answers using a language such as Structure Query Language (SQL). Although this language includes operators which can specify ranges for attributes, these ranges must be entered manually. A conventional database does not have any capability for producing approximate answers, or for accepting conceptual queries.

In order to overcome this limitation of the prior art, the present invention provides an extended query language which the inventor has named "Cooperative Structure Query Language (CoSQL)". In association with the extended language, the inventor has named the system 10 "Cooperative Database (CoBase)".

As will be described in detail below, CoSQL includes a number of cooperative operators including value-based operators and condition-based operators. The database 14 is not capable of recognizing or processing these operators per se. For this reason, the system 10 includes means for converting an input CoSQL query into an internal query representation or "query rep" which can be processed by the various units of the system 10.

Means are also provided for converting a query rep into a database query in SQL or other format which can be processed by the database 14. In the database query, the cooperative operators are converted into operators which can be recognized by the database 14, e.g. SQL operators.

More specifically, the system 10 comprises ten major components (modules or units), including the controller 16 and excluding the database 14. It will be noted that the database 14 is not part of the system 10 per se, but can be included with the system 10 in a bundled software package. The ten components are as follows:

Data Source Manager 18
Execution Trace 20
Explanation Server 22
Query Parser 24
Postprocessor 26
Preprocessor 28
Relaxation Engine 30
Controller 16
Schema Manager 32
TAH Manager 34

The units of the system 10 communicate with each other using a common "language", more specifically the query rep as described above. The query rep is an object which includes a select list, a from list, a where condition tree, a relaxation order structure, a ranking structure, and an at-least structure.

Each unit can construct any specific part of a query rep, get information from a query rep, or make changes to a query rep. The query rep object provides a set of functions to perform these tasks.

Figure 2:
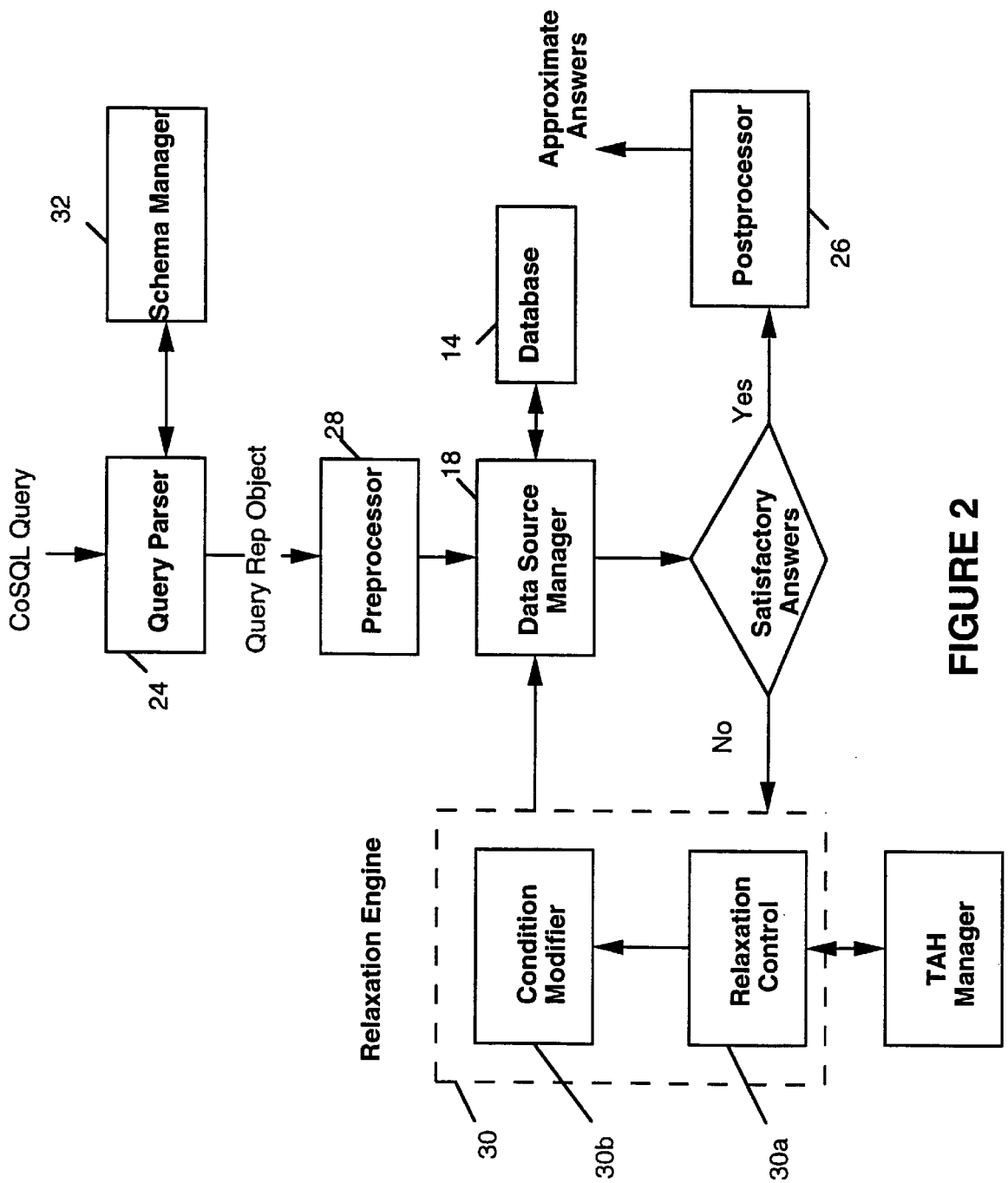
FIG. 2 is a general flowchart illustrating the operation of the system of FIG. 1.

As illustrated in FIG. 2, the system 10 receives a CoSQL query from the terminal 12, which the controller 16 passes to the query parser 24. The parser 24 accesses the schema manager 32 to check the syntax of the query, and converts the CoSQL query into a query rep which is then returned to the controller 16.

The controller 16 sends the query rep to the preprocessor 28, which converts any cooperative operators in the query rep into a form which can be processed by the other modules. The modified query rep is then returned to the controller 16, which transfers the query rep to the data source manager 18.

The manager 18 converts the query rep into an SQL query, in which the cooperative operators in the query rep are converted into SQL operators which can be recognized by the database 14. The SQL query is applied to the database 14, which returns data in the form of one or more answers if the database 14 contains any entry which satisfies the conditions of the attributes of the query. If no match is found, the database 14 returns a negative message such as "no match found".

The data source manager 18 sends the results from the database 14 to the controller 16 as answer tuples. If these include the target data (a specified number of answers which satisfy the query conditions), the controller 16 sends these results to the terminal 12 for display to the user. If not, the controller 16 sends the query rep to the relaxation engine 30 for the purpose of relaxing the conditions which will satisfy the query.

Each query includes one or more attributes. Taking, for example, an airline reservation database, the attributes will include departure city, arrival city, departure time, arrival time, cost, etc. The relaxation engine 30 relaxes the conditions of one or more of the attributes utilizing a Type Abstraction Hierarchy (TAH) structure which is stored in the TAH manager 34. The TAH structure includes at least one TAH consisting of leaves and nodes as will be described in detail below.

Assuming the exemplary case of an airline reservation system, the query may initially specify a departure time of 10:00. The database 14 may not include a flight which departs at this time. In this case, the relaxation engine 30 will access the hierarchical TAH structure in the TAH manager 34 to change the departure time (attribute) condition in the query rep from 10:00 to a range such as 9:30 to 10:30. The data source manager 18 again access the database 14 with the query as modified to have the relaxed condition.

This process is repeated until the target data is obtained from the database 14, or until all relaxable conditions have been relaxed and the target data has still not been obtained. The other attribute conditions are progressively relaxed in an order which can be specified in the CoSQL query, and/or programmed into the relaxation engine 30. For example, the departure time condition can be progressively relaxed to 9:00 to 11:00, then to 8:30 to 11:30, etc. If no satisfactory answer, then relax the arrival time until answers which satisfy the relaxed conditions are obtained from the database 14.

The structure and functionality of the individual units or modules will now be described in further detail.

Controller 16

The controller 16 is the main interface to the "outside world", which can be a graphical or textual user interface or another program running on the terminal 12. The controller 16 is the controlling unit of the system 10, and dispatches the query rep to the other units to allow them to perform some specific tasks to the query. It is the module that decides when to stop query relaxation based on the criteria specified by the user.

For queries that involve the UNION, INTERSECT or MINUS operator, the controller 16 needs to perform some special processing. In particular, the controller 16 needs to create a relaxation structure for each subquery and keep track of which one to send to the relaxation engine 30 if the query needs to be relaxed.

For queries that contain the AT-LEAST operator, the controller 16 needs to replace the SELECT list with the expression specified in the AT-LEAST clause. When answers are returned from the data source manager 18, the controller 16 checks whether the number of answers satisfy the AT-LEAST condition. If not, the controller 16 sends the query rep to the relaxation engine 30 to have it relaxed.

If the number of answers satisfies the AT-LEAST condition, the controller 16 replaces the SELECT list with the original one and sends the query to the data source manager 18 to obtain answers.

Schema Manager 32

The schema manager keeps track of the database schema so that other modules can get or verify such schema information as attribute names as well as their corresponding data types. The schema manager 32 communicates with the data source manager and monitors the schema. If the database schema has been changed, the schema manager automatically updates the contents of its schema file.

Data Source Manager 18

The data source manager 18 accepts a query rep, sends a corresponding SQL query to the database 14, and returns the answers. It connects to the database 14 through a software interface or "wrapper". New databases can be connected by adding new wrappers. It is within the scope of the invention for the system 10 to query more than one database using the data source manager 18.

Query Parser 24

The query parser 24 transforms a CoSQL query into a query rep object. The query parser 24 perform two services. The first is to check the syntax of the query. The query parser 24 communicates with the schema manager 32 to obtain schema information. If the syntax is correct, then the query is passed to the second part. The second part extracts all the information from the query and creates a query rep object.

Preprocessor 28

The preprocessor 28 accepts a query rep object and looks for conditions with CoSQL operators like SIMILAR-TO, WITHIN, REJECT, approximate, or any conceptual terms. It then processes those conditions, removes the CoSQL operators, and outputs the modified query rep. The preprocessor communicates with the TAH manager 34 to obtain information about any conceptual terms or approximate values. It also communicates with the data source manager 18 to obtain similar values when a SIMILAR-TO is specified by the "BASED ON" clause.

Relaxation Engine 30

The relaxation engine 30 includes a relaxation control unit 30a and a condition modifier 30b. The relaxation control unit 30a builds a relaxation structure based on the specified relaxation order, chooses what conditions to relax based on current relaxation strategy, and communicates with the TAH manager to find Multiple TAHs (MTAHs) or TAHs for all relaxable conditions, and locates the correct TAH nodes.

After selecting the conditions to relax, it then builds a condition object for each condition to be relaxed, and sends it to the condition modifier 30b. The condition modifier 30b goes through all the condition objects, makes necessary changes, and returns the modified condition objects to the data source manager 18.

The relaxation engine 30 provides guidance to relaxation. As a result, the relaxation engine 30 not only provides efficiency in generating the answer but also provides more user specific and accurate answers.

The following is a list of relaxation control operators which can be applied by the relaxation engine 30.

Relaxation order (e.g. airline, airfare), using with two or more attributes.

Preference list (used for a single attribute, e.g. A.A., United, TWA).

Relaxation level (e.g. 30%; stop relaxation of an attribute when it reaches 30% of the max attribute value.

Reject (e.g. US Air).

Unrelaxable (e.g. departure time).

At least (n) (at least n answers).

Use TAHx (use TAH x for relaxation of an attribute).

Postprocessor 26

The postprocessor 26 accepts a query rep and the answer tuples, and outputs the answer tuples in ranked order. It first checks to see if a RANK-BY clause is specified in the query rep. If so, the postprocessor 26 ranks the answer tuples according to the given method based on the specified attributes in the RANK-BY clause.

Execution Trace 20

The execution trace 20 keeps track of all the actions incurred on the query rep by each module. It also informs registered clients (e.g. Explanation Server 22) about those changes. A client can also query the execution trace 20 about specific changes in the query rep. All modules need to communicate with the execution trace 20 to record their changes to the query rep.

Explanation Server 22

The explanation server 22 receives information from the execution trace 20 whenever a module creates, modifies or deletes a query rep. The explanation server 22 then builds a trace of the relaxation process and outputs explanations to the graphical user interface in the terminal 12.

TAH Manager 34

The TAH manager 34 performs three separate and interlinked functions: TAH directory, TAH relaxation and TAH editing. A directory is kept for all the TAHs in the system 10 so that other modules can query the TAH manager 34 to get information about TAHs. The TAH manager 34 can locate any TAHs and MTAHs given a table name and one or more attribute names.

Given a TAH name and a node name or a value, the TAH manager 34 can locate the TAH node corresponding to the name or the value. Given a TAH node, the TAH manager 34 can perform generalization or specialization in a TAH. Based on specified attributes, new TAHs can be generated from the database 14 in the TAH manager 34. The TAH editor allows a user to delete, move or add nodes in the TAH to satisfy user requirements.

The operation of the system 10 can be summarized as comprising the following steps as illustrated in FIG. 2.

STEP 1

When the controller 16 receives a CoSQL query from the user, it first passes the query to the query parser 24. The query parser 34 takes the CoSQL query, checks its syntax, and then returns a query rep that reflects the contents of the query.

STEP 2

The controller 16 then sends this newly created query rep to the preprocessor 28, which translates any SIMILAR-TO, WITHIN, REJECT operators that are in the query rep to regular SQL conditions. It also translates any approximate or conceptual terms specified in the query rep into approximate attribute values. The preprocessor 28 then returns the modified query rep to the controller 16.

STEP 3

If the query contains an AT-LEAST clause, the controller 16 then sends the query rep to the data source manager 18, which builds the SQL query from the query rep and sends it to the database 14. It then returns query results to the controller 16.

STEP 4

If the query returns no answer or not enough answers to satisfy the AT-LEAST clause, the controller 16 sends the query rep to the relaxation engine 30 to have it relaxed. When the relaxation engine 30 receives the query rep, it selects the conditions to be relaxed based on the current relaxation strategy.

For each condition that is to be relaxed, the relaxation control 30a calls the TAH manager 34 to generalize or specialize to the appropriate TAH nodes, then passes this new condition information to the condition modifier 30b. The condition modifier 30b then modifies the query rep accordingly. The modified query rep is then returned to the relaxation manager 30.

STEP 5

If no AT-LEAST condition is specified, the controller 16 repeats STEP 3 and STEP 4 until answers are returned from the data source manager 18. Otherwise, it repeats until the AT-LEAST condition is satisfied and then replaces the SELECT list with the original one and sends the query rep to the data source manager 18 again. After the manager 18 returns answers, the controller 16 sends the query rep to the postprocessor 26.

The postprocessor 26 takes care of the RANK-BY clause by ranking the answer tuples according to the method specified. The controller 16 then returns the result back to the user via the terminal 12.

Figure 3:
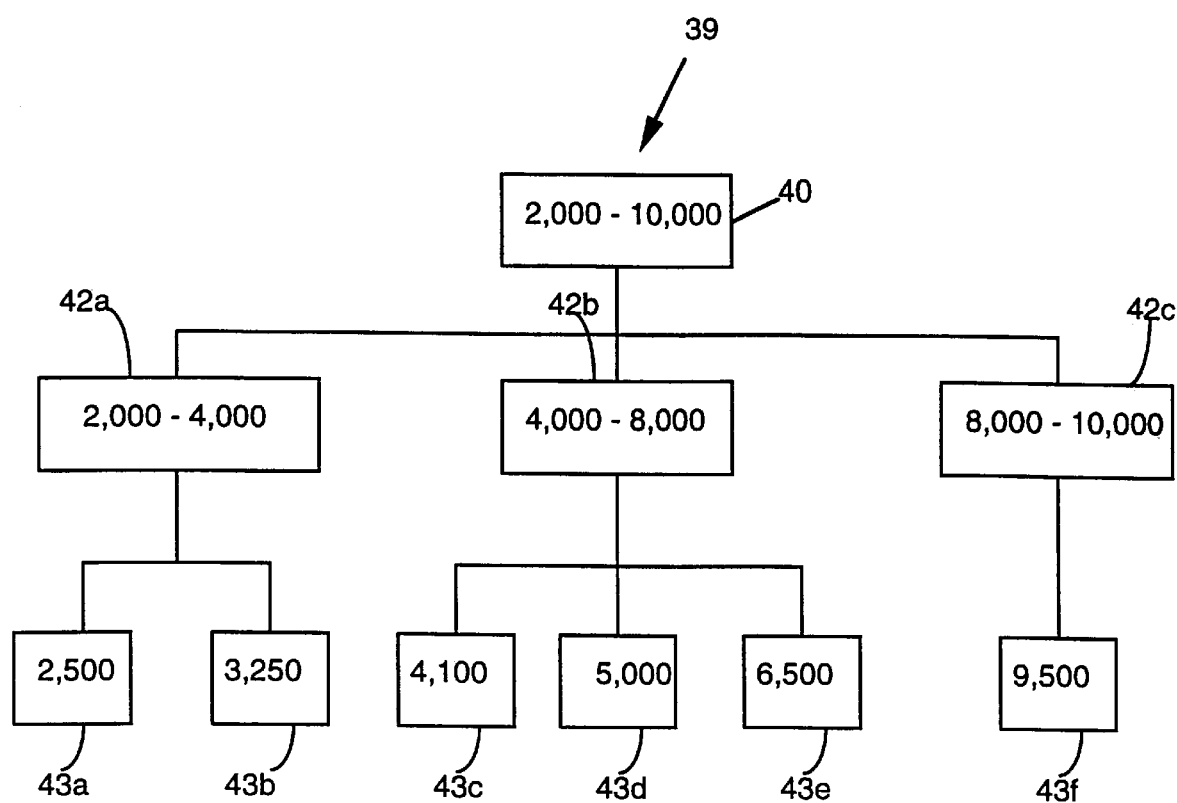
FIG. 3 is a diagram illustrating a Type Abstraction Hierarchy (TAH)

The arrangement of a single TAH 39 is illustrated in FIG. 3. Each attribute which can be relaxed is included in at least one TAH. As will be described in detail below, a Multiple TAH (MTAH) can include two or more attributes.

The TAH 39 includes only one attribute, for example the length of an airport runway. The arrangement accommodates runways in the database 14 which can have lengths between 2,000 and 10,000 feet.

The TAH 39 includes leaves 43a to 43f, which are constituted by discrete numbers or instances, each corresponding to a runway length of a data item in the database 14. The leaves 43a to 43f are connected upwardly to nodes 42a to 42c in a hierarchical or tree structure. For example, the leaves 43a and 43b are connected upwardly to the node 42a. All of the nodes 42a to 42c are connected upwardly to a root node 40.

Each higher level in the TAH 39 represents a greater level of relaxation. For example, the leaves 43a and 43b represent discrete runway lengths of 2,500 and 3,250 feet respectively. If a query initially specifies a runway length of 3,000 feet, the query will return a "match not found" answer because there is no runway in the database 14 with a length of exactly 3,000 feet.

The first relaxation level is represented by the node 42a, which specifies that the desired runway can have a length of between 2,000 and 4,000 feet. A query as modified with this relaxed condition would return the two instances 43a and 43b with runway lengths of 2,500 feet and 3,250 feet respectively. The highest level as represented by the root node 40 would return all runways in the database as represented by the nodes 43a to 43b.

The detailed structure and operation of the invention will become more clear from the following detailed example with reference being made to FIGS. 4 to 7.

EXAMPLE

FIG. 4 illustrates a database file or schema which is stored as a data file and operated on by the executable program in the database 14. The example represents an airline reservation system listing 9 flights on 3 different airlines, American, United and Delta. The entry for each flight includes 11 attributes: airline, arrival airport (aport) arrival city, etc., as illustrated in the drawing.

Figure 5:
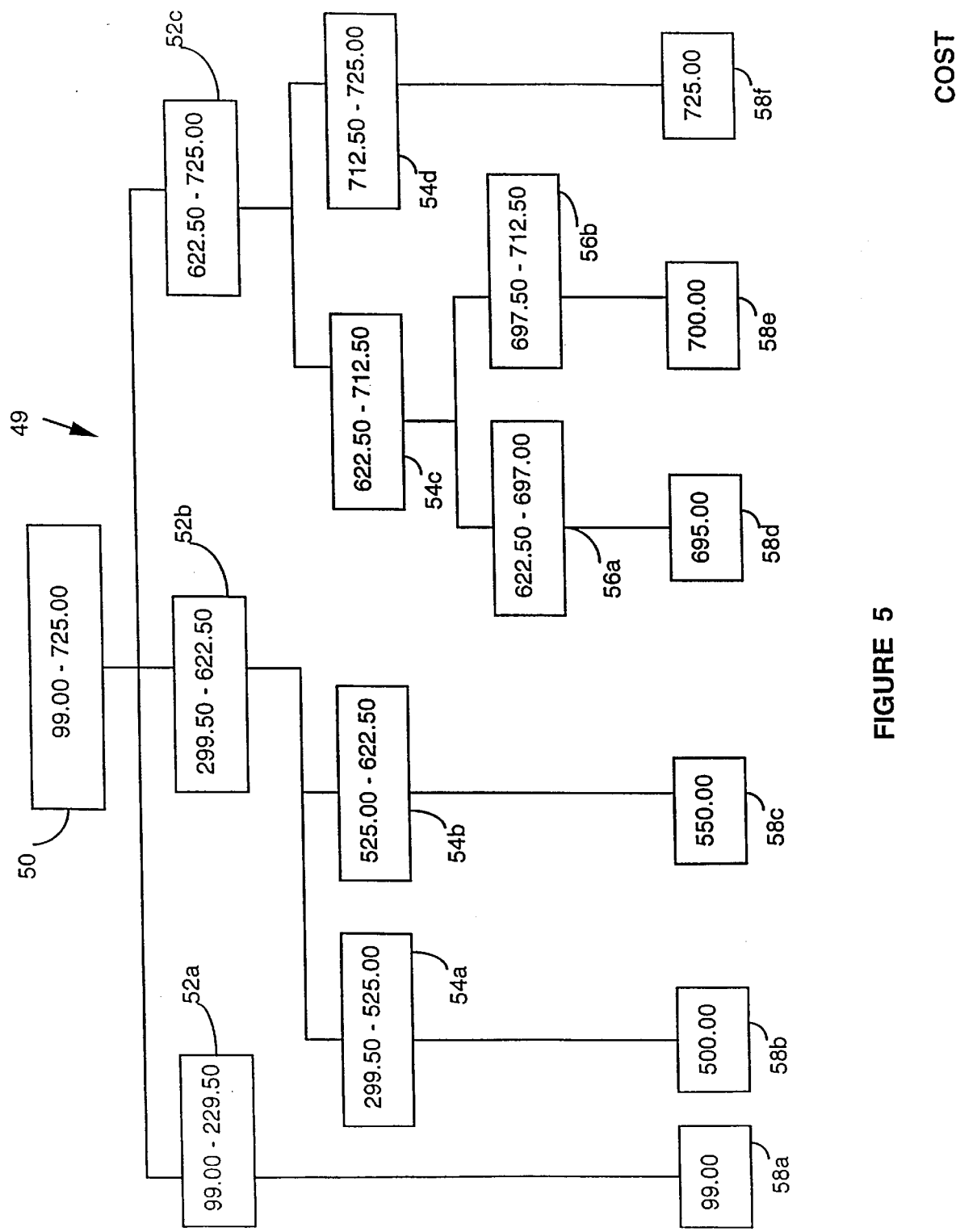
FIG. 5 is a diagram illustrating a TAH for airline cost corresponding to the data in the database.

FIG. 5 illustrates a TAH 49 for the cost of the flights. Referring also to the table of FIG. 4, the nine flights have six possible values of cost: 99.00, 500.00, 550.00, 695.00, 700.00, and 725.00 as contained in leaves 58a to 58f. It will be noted that some values are duplicated, such as the cost of 500.00 for flights UA 015 and DL 1105. However, the duplicate values are not listed in the TAH.

The TAH 49 includes a root node 50, first level nodes 52a to 52c, second level nodes 54a to 54d, third level nodes 56a and 56b, and the leaves 58a to 58f.

Figure 6:
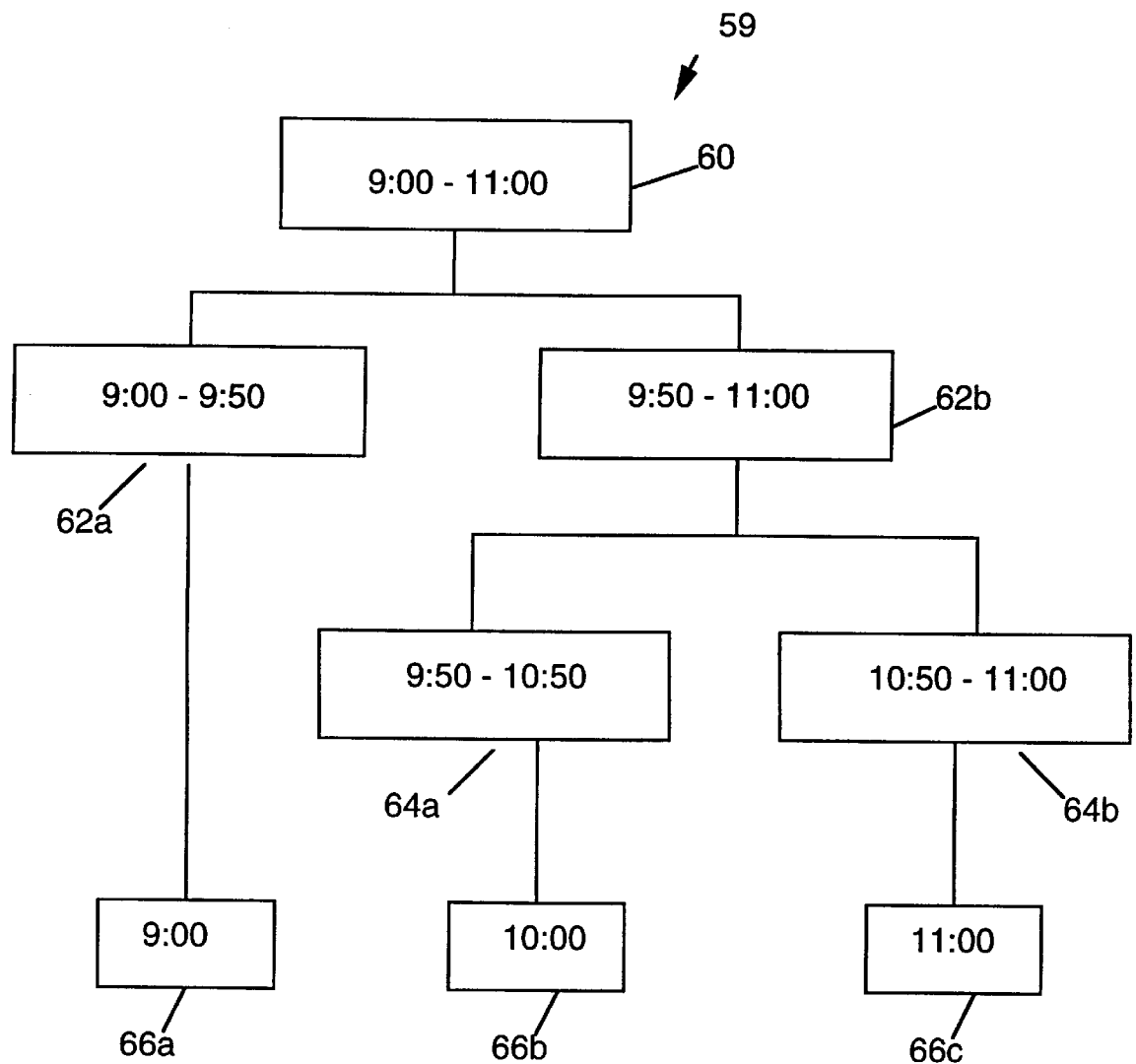
FIG. 6 is a diagram illustrating a TAH for airline departure time corresponding to the data in the database.
Figure 7:
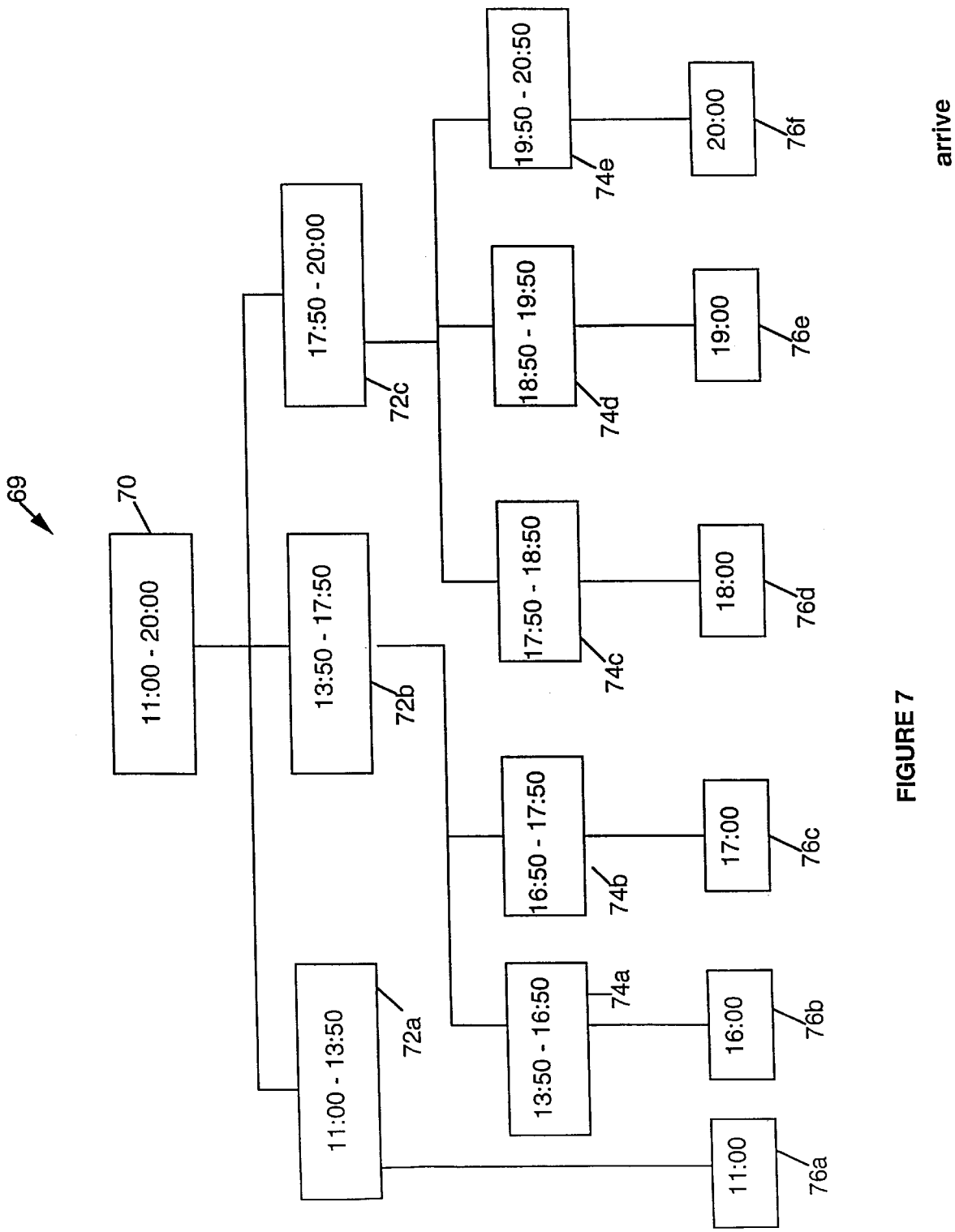
FIG. 7 is a diagram illustrating a TAH for airline arrival time corresponding to the data in the database.

FIG. 6 illustrates a TAH 59 for departure time, including a root node 60, first level nodes 62a and 62b, second level nodes 64a and 64b, and leaves 66a to 66c. FIG. 7 illustrates a TAH 69 for arrival time, including a root node 70, first level nodes 72a to 72c, second level nodes 74a to 74e, and leaves 76a to 76f. Similar TAHs are provided for the other attributes, e.g. departure airport, stop-over airport, although not explicitly illustrated.

Query Description

Find an airline for traveling from Los Angeles to New York City or Newark that leaves at 10:00 a.m., arrives before 6:00 p.m. and costs less than $600. No non-stop flights.

Relaxation order: cost, departure time, arrival time

Reject: stop over in Chicago

Preference list: departure airport—Los Angeles, John Wayne arriving airport—John F. Kennedy, Newark airline—United, American, Delta stop over city—San Francisco, Atlanta CoSQL query:

```
"SELECT flight_number, departure_city, arrival_city,
departure_time, arrival_time, cost, stop_over, stop_over_city
FROM airline_info
WHERE departure_time = 10
AND stop_over_city = PREFER ('San Francisco', 'Atlanta') REJECT
('Chicago')
AND departure_city = 'Los Angeles'
AND arrival_city = PREFER ('New York', "Newark')
AND arrival_time < 18
AND cost < 600
AND airline = PREFER ('United', 'American', 'Delta')
RELAX-ORDER [cost departure_time arrival_time]"
```

STEP 1: Parse query

Input to Parser: CoSQL query (shown above)

Output from Parser: Original Query Rep

```
SELECT    AIRLINE_INFO.FLIGHT_NUMBER
AIRLINE_INFO.DEPARTURE_CITY,
          AIRLINE INFO.ARRIVAL_CITY, AIRLINE_INFO.DEPARTURE-
TIME,
          AIRLINE_INFO.ARRIVAL-TIME, AIRLINE_INFO.COST,
AIRLINE_INFO.STOP_OVER,
          AIRLINE_INFO.STOP_OVER_CITY
FROM      AIRLINE_INFO
WHERE     AIRLINE_INFO.DEPARTURE_TIME = 10 LABEL DEPARTURE_TIME
          AND AIRLINE_INFO.STOP_OVER_CITY = PREFER ('San
Francisco', 'Atlanta')
              REJECT ('Chicago')
          AND AIRLINE_INFO.DEPARTURE_CITY - 'Los Angeles'
          AND AIRLINE_INFO.ARRIVAL_CITY = PREFER ('New York',
'Newark')
          AND AIRLINE_INFO.ARRIVAL_TIME < 18 LABEL ARRIVAL_TIME
          AND AIRLINE_INFO.COST < 600 LABEL COST
          AND AIRLINE_INFO.AIRLINE = PREFER ('United',
'American', 'Delta')
```

RELAXATION-ORDER [COST DEPARTURE_TIME ARRIVAL_TIME]
STEP 2: Preprocess query
Preprocessor translates the REJECT clause for stop over city into a SQL NOT condition.
Input to Preprocessor: Original Query Rep from STEP 1.
Output from Preprocessor: Modified Query Rep The data source manager 18 uses the as_string function in QueryRep to translate the query rep to a SQL query and then execute the query. For PREFER clauses (preference list: the Data Source Manager uses the first choice when it submits the query to the database.

Input to Data Source Manager:

```
SELECT AIRLINE_INFO.FLIGHT_NUMBER, AIRLINE_INFO.DEPARTURES_CITY,
          AIRLINE_INFO.ARRIVAL_CITY,
AIRLINE_INFO.DEPARTURE_TIME,
          AIRLINE_INFO.ARRIVAL_TIME, AIRLINE_INFO.COST,
AIRLINE_INFO.STOP_OVER,
          AIRLINE_INFO.STOP_OVER_CITY
FROM      AIRLINE_INFO
WHERE     AIRLINE_INFO.DEPARTURE_TIME = 10 LABEL DEPARTURE_TIME
          AND AIRLINE_INFO.STOP_OVER_CITY = PREFER ('San
Francisco', 'Atlanta'
    AND ! (NOT AIRLINE_INFO.STOP_OVER_CITY in ('Chicago'))
          AND AIRLINE_INFO.DEPARTURE_CITY = 'Los Angeles'
          AND AIRLINE_INFO.ARRIVAL_CITY = PREFER ('New York',
'Newark')
          AND AIRLINE_INFO.ARRIVAL_TIME < 18 LABEL ARRIVAL_TIME
          AND AIRLINE_INFO.COST < 600 LABEL COST
          AND AIRLINE_INFO.AIRLINE = PREFER ('United',
'American', 'Delta')
```

RELAXATION-ORDER [COST DEPARTURE_TIME ARRIVAL_TIME]

```
SELECT    AIRLINE_INFO.FLIGHT_NUMBER
AIRLINE_INFO.DEPARTURE_CITY,
          AIRLINE_INFO.ARRIVAL_CITY
AIRLINE_INFO.DEPARTURE_TIME,
          AIRLINE_INFO.ARRIVAL_TIME, AIRLINE_INFO.COST,
AIRLINE_INFO.STOP_OVER,
          AIRLINE_INFO.STOP_OVER_CITY
FROM      AIRLINE_INFO
WHERE     AIRLINE_INFO.DEPARTURE_TIME = 10
          AND AIRLINE_INFO.STOP_OVER_CITY - 'San Francisco'
          AND NOT AIRLINE_INFO.STOP_OVER_CITY IN ('Chicago')
          AND AIRLINE_INFO.DEPARTURE_CITY = 'Los Angeles'
          AND AIRLINE_INFO.ARRIVAL_CITY = 'New Yark'
          AND AIRLINE_INFO.ARRIVAL_TIME < 18
          AND AIRLINE_INFO.COST < 600
          AND AIRLINE_INFO.AIRLINE = 'United'
```

STEP 3: Submit query to Data Source Manager

Output from Data Source Manager: No answer

Note: the only flights which cost less than 600 are AA 1873, AA 140, UA 015 and DL 1105. Flight AA 1873 is unacceptable because it departs from San Francisco. The other flights arrive later than 18:00.

STEP 4: Send query to Relaxation Engine

First, the relaxation control 30a finds all possible TAHs and MTAHs for the query. It also selects which condition to relax and the locate the appropriate TAH node for that particular condition. Then the selected condition and the TAH information is passed to the condition modifier 30b, which changes the query rep based on the information supplied by the relaxation control 30a and outputs the modified query rep.

Input to Relaxation Engine:

```
SELECT    AIRLINE_INFO.FLIGHT_NUMBER,
AIRLINE_INFO.DEPARTURE_CITY,
          AIRLINE_INFO.ARRIVAL_CITY,
AIRLINE_INFO.DEPARTURE_TIME,
AIRLINE_INFO.ARRIVAL_TIME, AIRLINE_INFO.COST,
          AIRLINE_INFO.STOP_
          AIRLINE_INFO.STOP_OVER_CITY
FROM      AIRLINE_INFO
WHERE     AIRLINE_INFO.DEPARTURE_TIME = 10 LABEL DEPARTURE_TIME
          AND AIRLINE_INFO.STOP_OVER_CITY = PREFER ('San
Francisco', 'Atlanta'
          AND ! (NOT AIRLINE_INFO.STOP_OVER_CITY IN ('Chicago'))
          AND AIRLINE_INFO.DEPARTURE_CITY = 'Los Angeles'
          AND AIRLINE_INFO.ARRIVAL_CITY = PREFER ('New York',
'Newark')
          AND AIRLINE_INFO.ARRIVAL_TIME < 18 LABEL ARRIVAL_TIME
          AND AIRLINE_INFO.COST < 622.5 LABEL COST
          AND AIRLINE_INFO.AIRLINE = PREFER ('United',
'American', 'Delta'_
RELAXATION-ORDER [COST DEPARTURE_TIME ARRIVAL_TIME]
Possible TAHs and MTAHs:
Single Tah Candidates
{"AIRLINE_INFO" , { } , {{ "ARRIVAL_TIME" , 1 }} , {{
"ARRIVAL_TIME" 0 }} , "" , "" , "Tah#69" }
{"ARRIVAL_INFO" , { } , {{ "COST" , 1 }} , {{ "COST" , 0 }} ,
"", "" , "Tah#49" }
{"AIRLINE_INFO" , { } , {{ "DEPARTURE_TIME" , 1 }}, {{
"DEPARTURE_TIME, 0 } } , "" , "" , "Tah#59" }
```

Because a sequential relaxation order is specified on 3 single attributes, only single TAHs are used for relaxation.

The modified conditions for each step of relaxation are as follows. There is a relaxation order specified for this query, cost is relaxed first, then departure time and finally arrival time.

Modified Conditions:

First relaxation:

```
(
AIRLINE_INFO.COST < 622.5 LABEL COST Tah#49 Node: 52b
)
```
Repeating STEP 3: Submit query to Data Source Manager
Note: The first relaxation did not produce target data because, although the cost conditions have been relaxed from 600.00 to the range of 299.50 to 622.50, the relaxation did not produce any new candidates.
Second relaxation:
```
(
AIRLINE_INFO.COST < 725 LABEL COST TAH: Tah#49 Node: 50
)
```

Repeating STEP 3: Submit query to Data Source Manager

Note: The cost conditions have been relaxed to include all flights. A new candidate is flight UA 011. However, it is not acceptable because it is a non-stop flight.

Third relaxation:

```
(AIRLINE_INFO.DEPARTURE_TIME BETWEEN [9.5, 10.5] LABEL
DEPARTURE_TIME TAH: Tah#59 Node: 64a
)
```

Repeating STEP 3: Submit query to Data Source Manager

Note: The departure time conditions have been relaxed from 10:00 to the range of 9.5 (9:30) to 10.5 (10:30). However, this relaxation does not produce any new candidates.

Fourth relaxation:

```
(
AIRLINE_INFO.DEPARTURE_TIME BETWEEN [9.5, 11] LABEL
DEPARTURE_TIME TAH: Tah#59 Node: 62b
)
```

Repeating STEP 3: Submit query to Data Source Manager

Note: The departure time has been further relaxed to the range of 9:30 to 11:00. This produces flight AA 120 as a new candidate. However, this flight is unacceptable because it is non-stop.

Fifth relaxation:

```
(
AIRLINE_INFO.DEPARTURE_TIME BETWEEN [9, 11] LABEL
DEPARTURE_TIME TAH: Tah#59 Node: 60
)
```

Repeating STEP 3: Submit query to Data Source Manager

Note: The departure time has been further relaxed to the range of 9:00 to 11:00, and include all flights. This produces flights AA 110, UA 110 and DL 1104 as new candidates. However, these flights are unacceptable because they are non-stop.

Sixth relaxation:

```
(
AIRLINE_INFO.ARRIVAL_TIME < 18.5 LABEL ARRIVAL_TIME
TAH: Tah#69 Node: 74c
)
```

Repeating STEP 3: Submit query to Data Source Manager
Note: The arrival time condition has been relaxed from before 18:00 to before 18:50. However, this does not produce any new candidates.
Seventh relaxation:

```
(
AIRLINE_INFO.ARRIVAL_TIME < 20 LABEL ARRIVAL_TIME
TAH: Tah#69 Node: 72c
)
```

Repeating STEP 3: Submit query to Data Source Manager
Note: The arrival time has been further relaxed to before 20:00. This produces new candidates AA 140, UA 015, and DL 1105. Flight UA 015 is unacceptable because it stops over in Chicago. The other two flights are valid, and a choice must be made between them.
Eight relaxation:

```
(AIRLINE_INFO.STOP_OVER_CITY IN ('Atlanta') TAH: Node:
)
Repeating STEP 3: Submit query to Data Source Manager
Ninth relaxation:
(
AIRLINE_INFO.AIRLINE IN ('American') TAH: Node:
)
Repeating STEP 3: Submit query to Data Source Manager
Tenth relaxation:
(
AIRLINE_INFO.AIRLINE IN ('Delta') TAH: Node:
)
Repeating STEP 3: Submit query to Data Source Manager
Query Answers:
FLIGHT_NUMBER    DEPARTURE CITY    ARRIVAL CITY    DEPARTURE TIME
DL 1105          Los Angeles       New York        10
ARRIVAL_TIME     COST    STOP_OVER STOP_OVER_CITY
19               500     S         Atlanta
```

Note: Flight DL 1105 was selected because it stops over in the preferred city of Atlanta, and is on the Preferred airline Delta.

The relaxation process of the present invention produces generalization by traversing up the TAH nodes, and then specialization by applying other attribute conditions, until the optimal target data consisting of specific instances is obtained.

Figure 8:
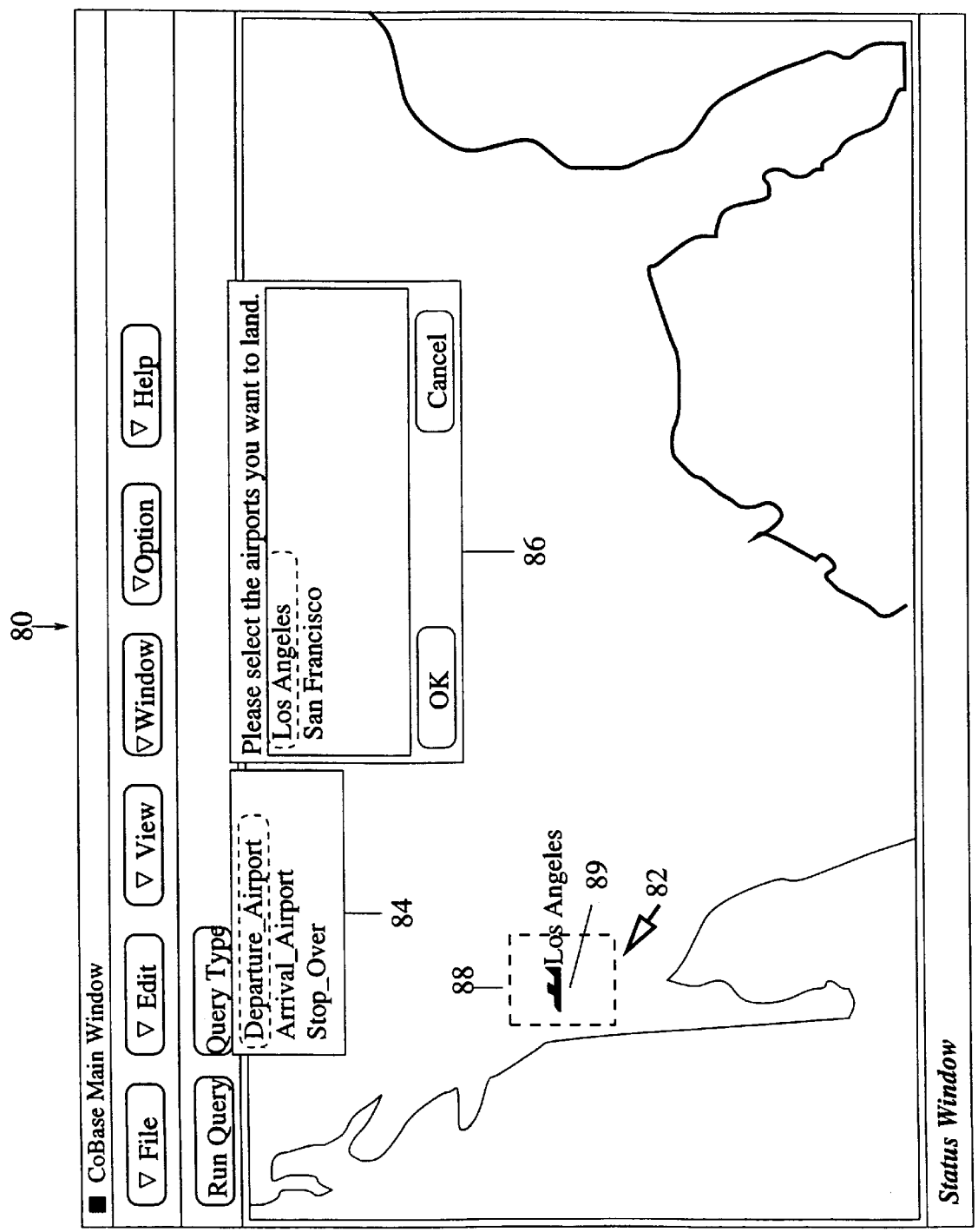
FIG. 8 is a diagram illustrating a Graphical User Interface (GUI) for inputting data into the system.

The initial query can be entered into the terminal 12 using either a Graphical User Interface (GUI) or a textual interface. FIG. 8 illustrates a GUI 80 which enables data to be entered using a mouse pointer 82 and pull-down menus 84 and 86.

The pull-down menu 84 provides a list of attributes such as cost, departure airport, etc. Double-clicking on an entry in the menu 84 produces the menu 86 which provides a list of the instances of the attribute, such as San Francisco, Los Angeles, etc. Double-clicking on an entry in the box 86 causes the selected instance to be entered into the query.

It is also within the scope of the invention to input data such as a geographical range using the pointer 82 in click-and-drag mode as indicated at 88. Clicking on a point produces an anchor, whereas dragging the pointer 82 produces a rectangular box which delineates a geographical area. As illustrated, the Los Angeles airport is indicated by an icon 89 within the box 88.

Figure 9:
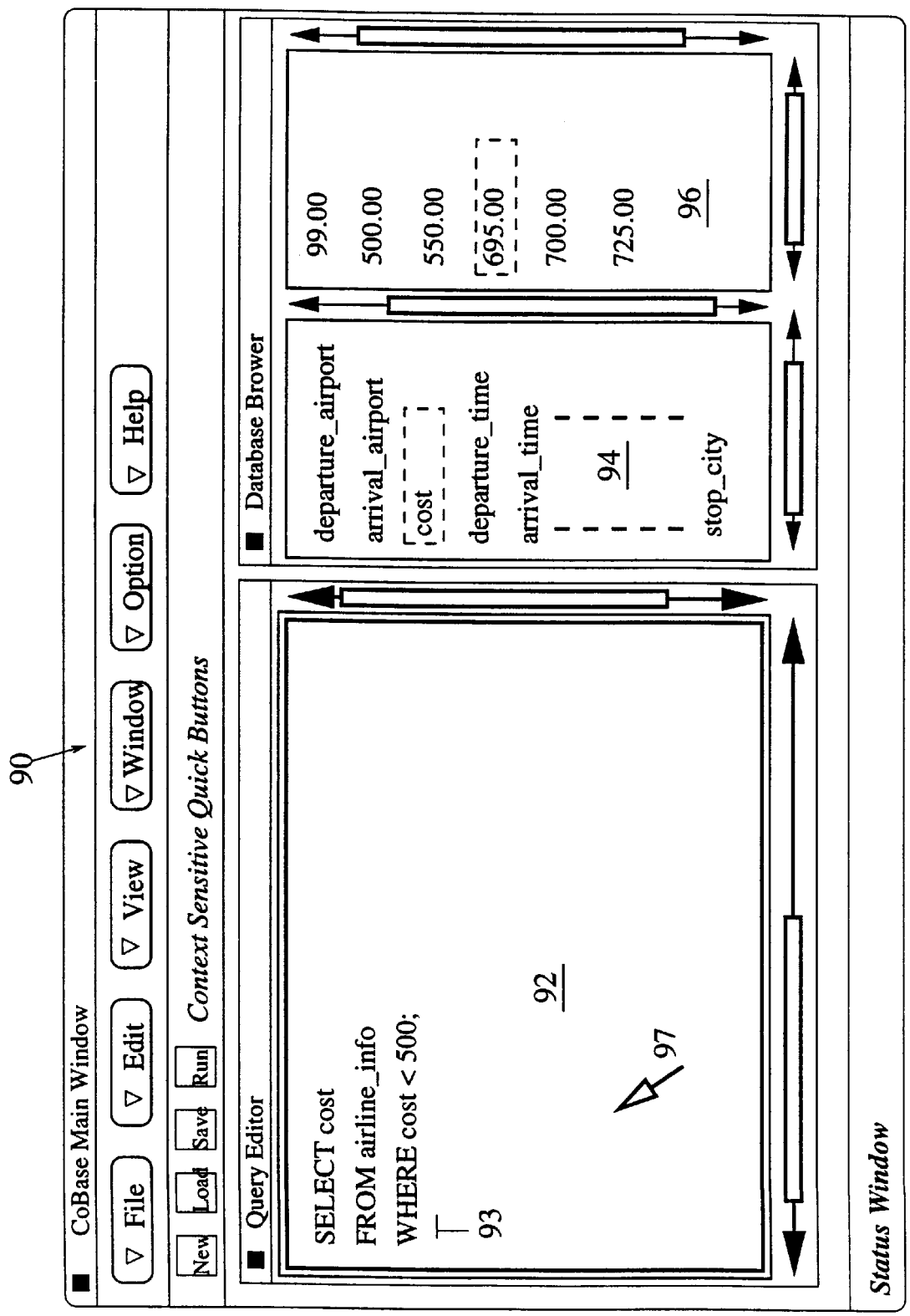
FIG. 9 is a diagram illustrating a pull-down menu system for inputting data into the system.

FIG. 9 illustrates a textual interface 90 for entering a query into the system 10. The interface 90 includes a main query entry box 92 into which data is typed at the position of a cursor 93. Further includes are two boxes 94 and 96 which list attributes and instances respectively. Double clicking on an entry in the box 94 or 96 using a mouse and pointer 97 causes the selected data to be entered into the box 92 starting at the current position of the cursor 93.

Type Abstraction Hierarchies TAHs

Figure 10:
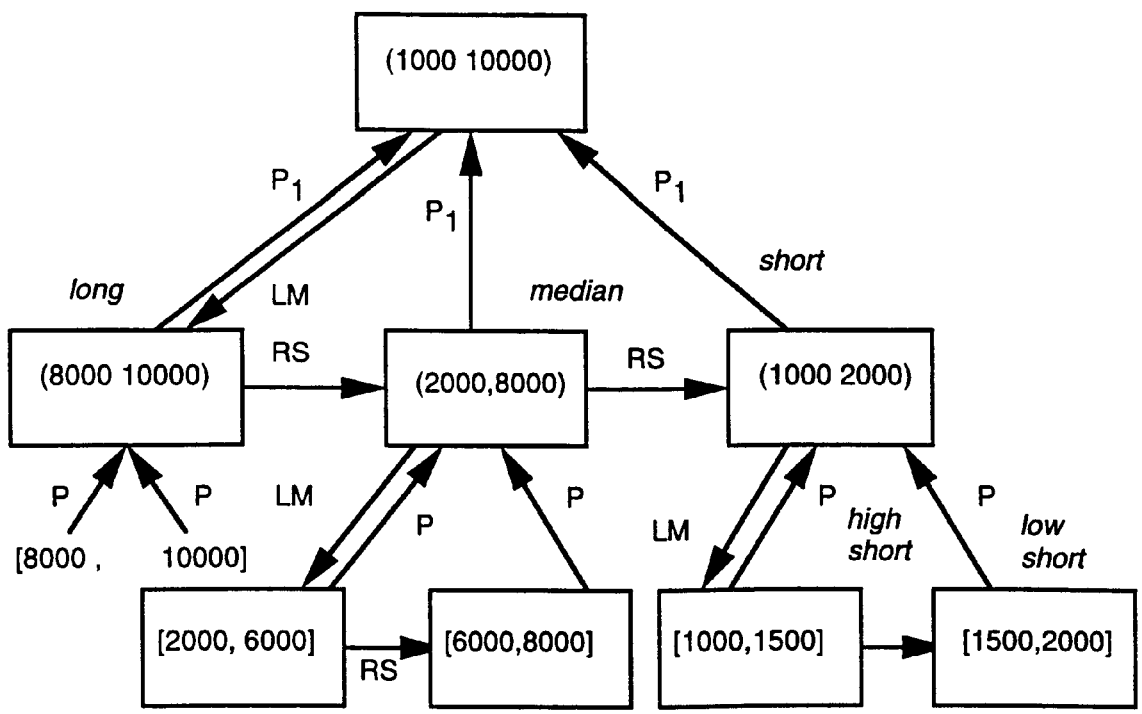
FIG. 10 is a diagram illustrating the relationship between nodes and leaves in an exemplary numerical TAH.
Figure 11:
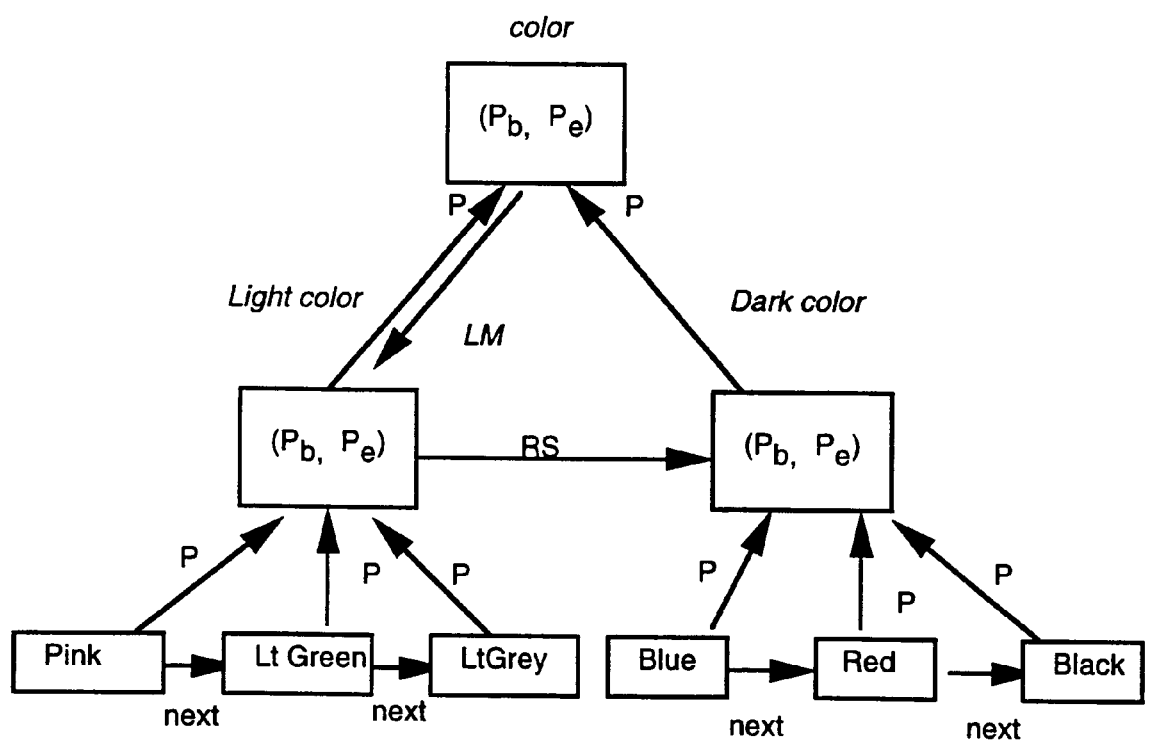
FIG. 11 is a diagram illustrating the relationship between nodes and leaves in an exemplary non-numerical TAH.

FIGS. 10 to 12 illustrate the structure of TAHs in more detail. A TAH is a tree structure knowledge representation which provides multi-level knowledge abstraction of data instances. The high level nodes in the tree provide more abstractions and generalizations of knowledge presentation than that of lower nodes.

A TAH can be classified by a single attribute (e.g., airport runway length as shown in FIG. 10, or by multiple attributes (e.g., location (latitude and longitude) of airports as shown in FIG. 12. Further, conceptual terms such as medium range or SW Tunisia can be defined on a TAH node as further illustrated in FIG. 12. Thus with the use of TAH, a query with conceptual terms can be processed.

A TAH provides an organized structure for relaxing query conditions. The condition can be generalized (enlarge search scope) by moving up and specialized by moving down (reduce the search scope) the hierarchy along the nodes. A TAH can contain numerical data or non-numerical data or a mixed-type of data.

Clustering algorithms enable numerical data from large databases to be classified automatically. A preferred clustering method can be based on minimizing the average pair-wise difference for all values in a cluster (relaxation error or intra-cluster error). A pattern-based knowledge induction algorithm can be used for automatically generating non-numerical attribute values which are based on inter-attribute relationships.

Querying conventional databases requires users to have detailed knowledge such as schema and attributes about the databases. If no exact answer can be found, it returns no answer. To remedy these shortcomings, the system 10 uses TAHs for query relaxation and approximate matching of query conditions, as well as for answering queries with conceptual terms. For example, finding an airport with a runway length of 6,500 feet, if no such airport can be found, based on the TAH generated from the runway length of all the airports, the query condition can be relaxed from 6,500 ft to 4,000 ft, 8,000 ft. And then find the airport with runway length close to 6,500 ft.

Further, when a query consists of conceptual term, eg. find an airport with medium range runway length, based on the TAH, the conceptual term "medium range" is transformed into 4,000 ft to 8,000 ft (by specialization) for query processing.

Objects with multiple attribute conditions may be relaxed and approximately matched via a multiple attribute TAH or multiple single TAHs in a similar manner. Since TAHs are generated by specifying a target attribute and a set of source attributes by a user based on the application, TAHs are customized to specific user type and application context.

TAH can be stored and re-used and located via searching the TAH directory. Further, a TAH can be edited via a knowledge editor to customize user and application needs. To provide a user with more application specific answers, TAH relaxation needs to be controlled.

The set of relaxation control parameters for TAHs are: relaxation order of the attributes, non-relaxable attributes, unacceptable list (the list of unacceptable condition values), relaxation level (the maximum amount of allowable relaxation attribute value), etc. The relaxation and relaxation control process can be observed and validated via the visualization tool.

The representation of a TAH in the TAH manager 34, and a method of traversing the TAH nodes, will be described with reference to FIGS. 10 and 11 and the following data structure listings.

Data Structure of a Numerical TAH (FIG. 10)
Root node: LM, nil, nil, ($R_1$, $R_2$,), TNN, coverage, RE
Intermediate node: LM, RS, P, ($R_1$, $R_2$), TNN, coverage, RE
Leaf node: nil, nil, P, ($R_1$, $R_2$), TNN, coverage RE
LM=pointer (address) to the left most child node
RS=pointer (address) to the next right sibling node at the same level
P=pointer to the parent node
($R_1$, $R_2$) range value of the node
TNN=TAH node name (conceptual name)
RE=Relaxation error
Coverage=% of instances covered by that node
Data Structure of a Non-Numerical TAH (FIG. 11)
Root node: LM, nil, nil, ($P_b$, $P_e$,), TNN, coverage, RE
Intermediate node: LM, RS, P, ($P_b$, $P_e$), TNN, coverage, RE
Leaf node: nil, nil, P, (S, Next), TNN, coverage RE
$P_b$=pointer to the beginning of a cluster
$P_e$=pointer to the end of a cluster
string=non numerical instances value
Next=pointer (address) to the next non-numerical instances To locate a TAH node that contains a numerical target value, the system 10 starts traversing down the TAH nodes from the top (root) of the TAH. The node traversing can be done based on the address of left most child node, LM, as well as the right sibling node, RS, can be obtained from the TAH node data.

To provide generalization, the address of the parent node, $P_1$ is used. Thus all the range values of the nodes can be obtained. For a numerical TAH (FIG. 10), only the range is important, since a conventional database 14 can derive the answers based on the range value ($R_1$, $R_2$). Thus, the specialization is a very simple step, substituting the range value from the generalization node query conditions.

For a non-numerical TAH, all instances must be retrieved rather than the range value. Thus the range value in the TAH node data structure is replaced by two pointers, one pointing to the beginning of the instances, $P_b$, and the other pointing to the end of the instances $P_e$ for all instances in that TAH node.

In the leaf node, the two pointers ($P_b$, $P_e$) are replaced by the string which represents the value of the non-numerical instances and the next pointer which links the next non-numerical instances.

To locate the target value from a non-numerical TAH, the system 10 searches all the leaf nodes until a match is found.

The generalization node can be located by the parent node pointer, P. For the specialization processing, the nodes and instances under the node can be obtained by LM, RS, $P_b$, $P_e$ and the next pointers.

FIG. 12 illustrates the structure of a Multiple TAH (MTAH), in which each node represents a rectangular geographical area defined by latitude and longitude ranges. The example illustrates airports in Tunisia, with the specific airports which constitute leaves are located at the lowest level. The nodes can have conceptual names, in the present example areas and subareas of Tunisia. The level of abstraction increases as the nodes are traversed upwardly. It will be understood that the number of attributes in an MTAH is not limited to two, but can have any number.

When using multiple attribute TAH (MTAH) for performing relaxation, unlike a single attribute TAH, during generalization all the attributes in the MTAH are relaxed together. Thus, relaxation order does not apply in the MTAH. However, relaxation order can be applied to different MTAHs.

For example,
(MTAH)$_1$=(airline, fare)
(MTAH)$_2$=(departure time, arrival time)
Relaxation order=(MTAH)$_1$, (MTAH$_2$)
Airline and airfare will be relaxed together first. If there is still no answer, then departure time and arrival time will be relaxed together.

As described above, the CoSQL query language of the present invention includes cooperative operators which make it possible to obtain approximate answers to specific queries, and to process conceptual queries.

The CoSQL language can include value based operators e.g. "APPROXIMATE". The language can also include condition based operators, including "SIMILAR-TO", "NEAR-TO" and "WITHIN", and relaxation control operators including "NON-RELAXABLE", "USE-TAH", "LABEL", "RELAX-LEVEL", "PREFER", "REJECT", "RELAX-ORDER", "AT LEAST", and "RANK-BY". The conceptual terms are defined by numerical ranges or lists of instances at the TAH node, and processed by the relaxation engine 30 using conditions which are specified in the CoSQL query, as well as a strategy which is predefined and programmed into the relaxation engine 30.

Automatic Knowledge Acquisition

The automatic generation of knowledge base (TAHs) from databases is essential for the system 10 to be scalable to a high level. Algorithms can be used to automatically generate TAHs based on database instances. A brief discussion about preferred algorithms and their complexity is presented below.

Numerical TAHs

For providing approximate answers, a classification tree should be constructed that minimizes the difference between the desired answer and the derived answer. Specifically, relaxation error is used as a measure for clustering. The relaxation error (RE) is defined as the average difference between the requested values and the returned values. $RE_1$ (C) can also be interpreted from the standpoint of query relaxation.

Define a relaxation error of $x_j$, $RE_1(x_j)$, as the average difference from $x_i$ to $x_j$, j=1, . . . , n, that is, $$RE_1(x_i) = \sum_{j=1}^{n} P(x_j)|x_i - x_j|$$

where $P(x_j)$ is the occurrence probability of $x_j$ in C. $RE_1(x_j)$ can be used to measure the quality of an approximate answer where $x_i$ in a query is relaxed to $x_j$, j=1, . . . , n.

Summing $RE_1(x_j)$ over all values $x_i$ in C produces $$RE_1(C) = \sum_{i=1}^{n} P(x_i)RE_1(x_i).$$

Thus, $RE_1(C)$ is the expected error of relaxing any value of C.

If $RE_1(C)$ is large, query relaxation based on C may produce very poor approximate answers. To overcome this problem, C can be partitioned into sub-clusters to reduce relaxation error. Given a partition $P=\{C_1, C_2, \ldots, C_N\}$ of C, the relaxation error of the partition P is defined as $$RE_1(P) = \sum_{k=1}^{N} P(C_k)RE_1(C_k)$$

where $P(C_k)$ equals the number of tuples in $C_k$ divided by the number of tuples in C.

In general, $RE_1(P) < RE_1(C)$.

Relaxation error is expected pair-wise difference between values in a cluster. Using relaxation error, the category utility can be defined as the relaxation error reduction per sub-cluster, that is $$CU = \frac{\sum_{k=1}^{N} P(C_k)[1 - RE_1(C_k)] - [RE_1(C)]}{N} \quad (1)$$

$$\left(= \frac{RE_1(C) - \sum_{k=1}^{N} P(C_k)RE_1(C_k)}{N}\right)$$

Distribution Sensitive Clustering (DISC) partitions sets of numerical values into clusters that minimize the relaxation error. The following is a class of DISC algorithms for clustering numerical values. The algorithm for a single attribute is presented, it can be extended for multiple attributes.

The Clustering Algorithm for a Single Attribute

Given a cluster with n distinct values, the number of partitions is exponential with respect to n, so the best partition according to (1) takes exponential time to find. To reduce computation complexity, only binary partitions (i.e., N=2 in (1)) are considered. Later, a simple hill climbing strategy will be presented for obtaining N-ary partitions from binary partitions.

The method is top down: start from one cluster consisting of all the values of an attribute, and then find "cuts" to recursively partition the cluster into smaller clusters. The partition result is a concept hierarchy called Type Abstraction Hierarchy (TAH). The clustering algorithm is called the DISC (Distribution Sensitive Clustering) Method and is presented below.

Algorithm DISC(C)

If the number of distinct values $\epsilon C < T$, return */T is a threshold */ let cut=the best cut returned by BinaryCut(C) partition values in C based on cut let the resultant sub-clusters be $C_1$ and $C_2$ call DISC($C_1$) and DISC($C_2$)

Algorithm BinaryCut(C)

/* input cluster C = $\{x_1, \ldots, x_n\}$ */ for h = 1 to n – 1 /* evaluate each cut */

-continued

Let P be the partition with clusters $C_1 = \{x_1, \ldots, x_h\}$ and $C_2$ $= \{x_{h\_}, \ldots, x_n\}$ compute $RE_1(P)$ if $RE_1(P) < MinRE$ then MinRE = $RE_1(P)$, cut = h /* the best cut */

Return cut as the best cut

N-ary Partitioning

N-ary partitions can be obtained from binary partitions by a hill climbing method. Starting from a binary partition, the sub-cluster with greater relaxation error is selected for further cutting. CU is used as a measure to determine if the newly formed partition is better than the previous one.

If the CU of the binary partition is greater than that of the tri-nary partition, then the tri-nary partition is dropped and the cutting is terminated. Otherwise, the tri-nary partition is selected and the cutting process continues until it reaches the point where a cut decreases CU.

In summary, the present invention overcomes the drawbacks of the prior art, and fulfills long felt needs, by providing a system and method for querying a conventional database which automates relaxation of query conditions (e.g. attribute values) produces approximate answers, and is capable of processing conceptual queries.

Various modifications will become possible for those skilled in the art after receiving the teachings of the present disclosure without departing from the scope thereof.

I claim:

1. A system for obtaining target data from a computer database in response to an input query which includes at least one attribute, comprising:

a Type Abstraction Hierarchy (TAH) manager for providing a TAH structure, including relaxation conditions for said at least one attribute; and a control unit for successively applying a database query which corresponds to the input query to and receiving data from the database, with progressively relaxed conditions of said at least one attribute provided by the TAH manager, until the targer data in the form of at least one answer which satisfies said at least one attribute is obtained.

2. A system as in claim 1, in which:

the input query can include a cooperative operator;

the database is not capable of directly processing the cooperative operator; and the control unit converts the cooperative operator into a database operator which the database is capable of processing.

3. A system as in claim 2, in which the cooperative operator is one of a value-based operator, a condition-based operator, and a relaxation control operator.

4. A system as in claim 3, in which the condition-based operator is SIMILAR-TO with a clause that BASED-ON at least one attribute.

5. A system as in claim 3, in which the relaxation control operator comprises at least one of relaxation order, preference list, relaxation level, reject, unrelaxable, at least, and use TAHx, where x is the name of a TAH to be used for relaxation.

6. A system as in claim 2, in which the control unit comprises:

a query parser for converting the input query into a query representation which the TAH manager is capable of processing;

a preprocessor for converting the cooperative operator in the query representation into the database operator; and a data source manager for converting the query representation into the database query, and applying the database query to the database.

7. A system as in claim 1, in which the control unit comprises a relaxation unit for accessing the TAH manager in accordance with a specified procedure.

8. A system as in claim 7, in which the relaxation unit comprises:

a relaxation controller for accessing the TAH manager; and a condition modifier for modifying said at least one attribute in accordance with progressively relaxed conditions thereof returned by the TAH manager.

9. A system as in claim 8, in which the control unit comprises:

a data source manager for applying the database query to and obtaining data from the database; and a controller for controlling operation of the data source manager, relaxation unit, and TAH manager.

10. A system as in claim 7, in which:

said at least one attribute comprises a plurality of attributes; and said specified procedure comprises relaxing said plurality of attributes in a specified order.

11. A system as in claim 10, in which the input query comprises specification of said order.

12. A system as in claim 1, in which:

the input query is specific; and the target data comprises an approximate answer to the input query.

13. A system as in claim 1, in which the input query contains conceptual terms.

14. A system as in claim 1, in which the TAH structure comprises at least one TAH for each attribute respectively.

15. A system as in claim 1, in which the TAH structure comprises a TAH having leaves corresponding to instances of one of said at least one attribute respectively, and a hierarchical arrangement of nodes that specify ranges which include at least one of said instances respectively.

16. A system as in claim 15, in which the instances are numerical.

17. A system as in claim 15, in which the instances are non-numerical.

18. A system as in claim 15, in which the nodes have conceptual names.

19. A system as in claim 1, in which:

said at least one attribute comprises a plurality of attributes; and the TAH structure comprises a multiple attribute TAH which includes relaxation conditions for at least two of said plurality of attributes.

20. A system as in claim 19, in which said relaxation conditions are such that said at least two of said plurality of attributes in the multiple attribute TAH are relaxed together.

21. A system as in claim 1, in which:

said at least one attribute comprises a plurality of attributes; and the TAH structure comprises a first multiple attribute TAH which includes relaxation conditions for at least two of said plurality of attributes; and a second multiple attribute TAH which includes relaxation conditions for at least another two of said plurality of attributes.

22. A system as in claim 21, in which said relaxation conditions are such that said at least two of said plurality of attributes in the first multiple attribute TAH are relaxed together; and said at least another two of said plurality of attributes in the second multiple attribute TAH are relaxed together.

23. A system as in claim 22, in which said relaxation conditions are such that the first multiple attribute TAH and the second multiple attribute TAH are relaxed in a specified order.

24. A system as in claim 1, in which:

the target data comprises a plurality of answers; and the control unit further comprises a postprocessor for ranking the answers in accordance with a specified criterion.

25. A system as in claim 24, in which the input query specifies said criterion.

26. A system as in claim 1, in which:

the database comprises a schema including said at least one attribute;

the control unit comprises a schema manager which accesses the database to obtain a specification of the schema; and the control unit further comprises a query parser which checks syntax of the input query by obtaining said specification of the schema from the schema manager.

27. A system as in claim 1, in which the TAH manager comprises means for editing the TAH structure.

28. A system as in claim 1, in which the TAH manager comprises means for automatically obtaining information from the database and creating the TAH structure in accordance therewith.

29. A computer implemented method for obtaining target data from a computer database in response to an input query which includes at least one attribute, comprising the steps of:

(a) providing a Type Abstraction Hierarchy (TAH) structure including relaxation conditions for said at least one attribute;

(b) applying a database query which corresponds to the input query to the database;

(c) receiving data from the database;

(d) if the data received in step (c) comprises the target data, outputting the data and ending the method;

(e) if the data received in step (c) does not comprise the target data, accessing the TAH structure to obtain a relaxed condition of said at least one attribute;

(f) modifying the database query to include said relaxed condition; and (g) jumping to step (c).

30. A method as in claim 29, in which:

the input query can include a cooperative operator;

the database is not capable of directly processing the cooperative operator; and the method further comprises the step, performed prior to step (b), of:

(i) converting the cooperative operator into a database operator which the database is capable of processing.

31. A method as in claim 30, in which the cooperative operator is one of a value-based operator, a condition-based operator, and a relaxation control operator.

32. A method as in claim 31, in which the condition-based operator is SIMILAR-TO, BASED-ON.

33. A system as in claim 31, in which the relaxation control operator comprises at least one of relaxation order, preference list, relaxation level, reject, unrelaxable, at least, and use TAHx, where x is a number of a TAH.

34. A method as in claim 29, in which step (e) comprises the substeps of:

(e1) accessing the TAH structure in accordance with a specified procedure to obtain said relaxed condition; and (e2) modifying said at least one attribute to include said relaxed condition.

35. A method as in claim 34, in which:

said at least one attribute comprises a plurality of attributes; and said specified procedure in step (e1) comprises relaxing said plurality of attributes in a specified order.

36. A method as in claim 35, in which the input query comprises specification of said order.

37. A method as in claim 29, in which:

the input query is specific; and the target data comprises an approximate answer to the input query.

38. A method as in claim 29, in which the input query contains conceptual terms.

39. A method as in claim 29, in which the TAH structure comprises at least one TAH for each attribute respectively.

40. A method as in claim 29, in which the TAH structure comprises a TAH having leaves corresponding to instances of one of said at least one attribute respectively, and a hierarchical arrangement of nodes that specify ranges which include at least one of said instances respectively.

41. A method as in claim 40, in which the instances are numerical.

42. A method as in claim 29, in which the instances are non-numerical.

43. A method as in claim 29, in which at least some of the nodes have conceptual names.

44. A method as in claim 29, in which:

said at least one attribute comprises a plurality of attributes; and the TAH structure comprises a multiple attribute TAH which includes relaxation conditions for at least two of said plurality of attributes.

45. A method as in claim 44, in which said relaxation conditions are such that said at least two of said plurality of attributes in the multiple attribute TAH are relaxed together.

46. A method as in claim 29, in which:

said at least one attribute comprises a plurality of attributes; and the TAH structure comprises a first multiple attribute TAH which includes relaxation conditions for at least two of said plurality of attributes; and a second multiple attribute TAH which includes relaxation conditions for at least another two of said plurality of attributes.

47. A method as in claim 46, in which said relaxation conditions are such that said at least two of said plurality of attributes in the first multiple attribute TAH are relaxed together; and said at least another two of said plurality of attributes in the second multiple attribute TAH are relaxed together.

48. A method as in claim 47, in which said relaxation conditions are such that the first multiple attribute TAH and the second multiple attribute TAH are relaxed in a specified order.

49. A method as in claim 29, in which:

the target data comprises a plurality of answers; and the method further comprises the step of:

(h) ranking the answers in accordance with a specified criterion.

50. A method as in claim 29, in which the input query specifies said criterion.

51. A storage medium for storing a computer program for obtaining target data from a database in response to an input query which includes at least one attribute, the program controlling a computer to perform the steps of:

(a) providing a Type Abstraction Hierarchy (TAH) structure including relaxation conditions for said at least one attribute;

(b) applying a database query which corresponds to the input query to the database;

(c) receiving data from the database;

(d) if the data received in step (c) comprises the target data, outputting the data and ending the method;

(e) if the data received in step (c) does not comprise the target data, accessing the TAH structure to obtain a relaxed condition of said at least one attribute;

(f) modifying the database query to include said relaxed condition; and (g) jumping to step (c).

52. A medium as in claim 51, in which:

the input query can include a cooperative operator;

the database is not capable of directly processing the cooperative operator; and the program controls the computer to perform the further step, prior to step (b), of:

(i) converting the cooperative operator into a database operator which the database is capable of processing.

53. A medium as in claim 52, in which the cooperative operator is one of a value-based operator, a condition-based operator, and a relaxation control operator.

54. A medium as in claim 53, in which the condition-based operator is SIMILAR-TO, BASED-ON.

55. A medium as in claim 53, in which the relaxation control operator comprises at least one of relaxation order, preference list, relaxation level, reject, unrelaxable, at least, and use TAHx, where x is a number of a TAH.

56. A medium as in claim 51, in which step (e) comprises the substeps of:

(e1) accessing the TAH structure in accordance with a specified procedure to obtain said relaxed condition; and (e2) modifying said at least one attribute to include said relaxed condition.

57. A medium as in claim 56, in which:

said at least one attribute comprises a plurality of attributes; and said specified procedure in step (e1) comprises relaxing said plurality of attributes in a specified order.

58. A medium as in claim 51, in which the input query comprises specification of said order.

59. A medium as in claim 51, in which:

the input query is specific; and the target data comprises an approximate answer to the input query.

60. A medium as in claim 51, in which the input query is conceptual.

61. A medium as in claim 51, in which the TAH structure comprises at least one TAH for each attribute respectively.

62. A medium as in claim 51, in which the TAH structure comprises a TAH having leaves corresponding to instances of one of said at least one attribute respectively, and a hierarchical arrangement of nodes that specify ranges which include at least one of said instances respectively.

63. A medium as in claim 62, in which the instances are numerical.

64. A medium as in claim 62, in which the instances are non-numerical.

65. A medium as in claim 62, in which at least some of the nodes have conceptual names.

66. A medium as in claim 51, in which:
   said at least one attribute comprises a plurality of attributes; and
   the TAH structure comprises a multiple attribute TAH which includes relaxation conditions for at least two of said plurality of attributes.

67. A medium as in claim 66, in which said relaxation conditions are such that said at least two of said plurality of attributes in the multiple attribute TAH are relaxed together.

68. A medium as in claim 51, in which:
   said at least one attribute comprises a plurality of attributes; and
   the TAH structure comprises a first multiple attribute TAH which includes relaxation conditions for at least two of said plurality of attributes; and a second multiple attribute TAH which includes relaxation conditions for at least another two of said plurality of attributes.

69. A medium as in claim 68, in which said relaxation conditions are such that said at least two of said plurality of attributes in the first multiple attribute TAH are relaxed together; and said at least another two of said plurality of attributes in the second multiple attribute TAH are relaxed together.

70. A medium as in claim 69, in which said relaxation conditions are such that the first multiple attribute TAH and the second multiple attribute TAH are relaxed in a specified order.

71. A medium as in claim 51, in which:
   the target data comprises a plurality of answers; and
   the program controls the computer to perform the further step of:
   (h) ranking the answers in accordance with a specified criterion.

72. A medium as in claim 71, in which the input query specifies said criterion.

73. A medium as in claim 51, comprising a magnetic storage disk.

74. A medium as in claim 51, comprising an optical storage disk.

75. A medium as in claim 51, comprising a computer memory.

* * * * *